Jan. 16, 1945.  W. W. DALE  2,367,566
FRUIT HARVESTING BASKET
Filed Feb. 18, 1941
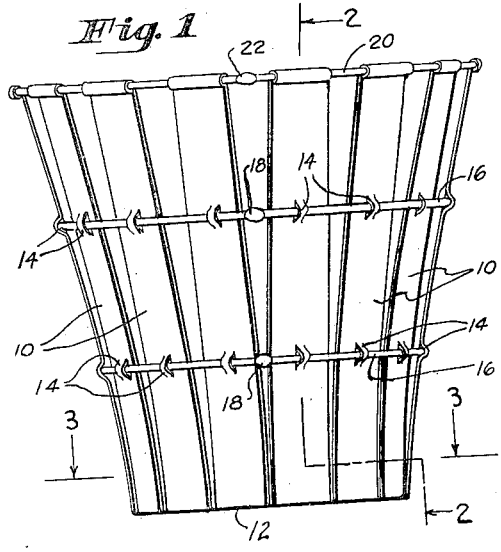
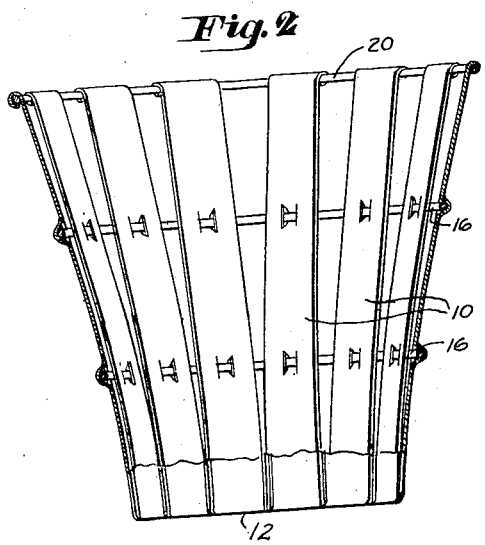
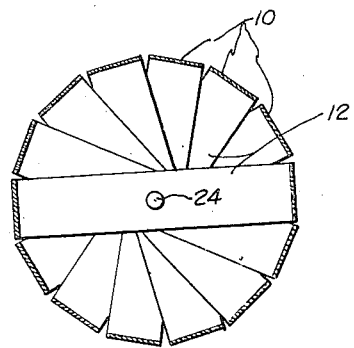
INVENTOR.
Wallace W. Dale
BY Everett Kent
ATTORNEY Patented Jan. 16, 1945

2,367,566

UNITED STATES PATENT OFFICE 2,367,566

FRUIT HARVESTING BASKET

Wallace W. Dale, Barre Center, N. Y.

Application February 18, 1941, Serial No. 379,515

1 Claim. (Cl. 220—83)

This invention relates to improvements in fruit harvesting baskets.

More particularly the invention deals with the problem of mold and other micro-organic deleterious contents of canned products of fruit and vegetables. The word fruit is herein used as a generic term for all kinds of fruit and vegetables.

In the case of tomatoes, for example, which may serve herein as illustration for all fruits and vegetables to which the invention is applicable, much trouble and loss are experienced from the presence of parasitical growths in tomato products, such as tomato paste, tomato puree, tomato catsup and tomato hot sauce, as well as tomato juice, tomato pulp and canned tomatoes, when offered to the public in cans or the like packages, as food products of responsible canneries.

The matter is of such importance to the public that, under authority of Congress, the Food and Drugs Administration, recognizing that no way has hitherto been found to eliminate this evil, prescribes maximum limits of permissible "mold count tolerance"; and makes inspections in factories and in markets; and seizes and condemns goods in which decomposition or parasitic growths are so perceptible that the goods are adjudged not suitable for public sale. Canners and other packers try to use only fresh fruit, and to maintain conditions of strict cleanliness in their plants; but in spite of all precautions, condemnations of this character occur to the extent of thousands of cases each year.

My production of the basket herein to be described is an important help in the eliminating of this evil.

The object of the invention, in this respect, is to provide an improved basket or hamper for use in the gathering of fruit in the field, and for its handling and transportation to the cannery or other factory. The feature of it which affects the ultimate fruit product offered by the factory to the public is its eliminating of contacts of raw fruit with germs, spores and other sources of transmission and growth of micro-organic life, so far as such contacts might occur while the fruit is being held in the basket, or is being carried in the basket. The improvement is that the entire interior surface of the basket, into which the picked fruit is placed, is made so as to be devoid of fibrous and other absorbent material; and devoid of crevices and other diminutive superficial roughnesses; and is affirmatively of a kind of material that is, both, not itself a nutrient medium for fungus or other micro-organic germ growth; and not a host to such a nutrient medium. And, preferably it is a kind of material on which the juice of the particular sort of fruit for which the basket is to be used does not become strongly adsorbed.

This involves the excluding of all surfaces of wood or the like, such as are ordinarily used in baskets, and the introducing of a kind of material, to sustain the contacts of basket with fruit, whose surface is barren of micro-organic life and of nutriment for such life, having also the characteristic that it can easily be washed clean under practical farm and canning conditions, and its state be determined by inspection if in fact it is not clean.

Although canners have long been well aware of the evil of mold, the practice is universal, so far as I have observed, that the baskets used for gathering fruit from vines or trees contain surfaces of wood or other material which have or soon acquire tiny cracks, crevices or roughnesses, or pores, wherein, without being observed, bacteria and plant fungi, spores and microbes can multiply in profusion. Some of such fungi grow in decaying matter; others thrive in living organic matter.

Fruit juice is by nature a culture medium for bacteria. Juice that runs from a tomato in a harvesting basket is apt to reach the basket's side or bottom. After a few hours this becomes sour. The basket may undergo a routine washing before being used again; but it is impracticable, if not actually impossible, to get the wood surface cleared of the contents of its microscopic crevices. In fissures, and on or beneath the surface, micro-organisms live and grow; and they are ready to contaminate freshly picked fruit that may later rest against them when the basket is next used. By providing that all fruit contacting surfaces in the basket are of smooth material to which fruit juice does not strongly adhere, the present invention makes a basket which for purposes of this specification may be called germ free.

Various materials are available for the making of such a basket, including the metals, regenerated cellulose, plastic formations of other synthetic materials, and coating compounds which have enough strength to cover fully, and to resist flaking from and fracture on, the surface which supports them. Among these, as prices of materials and costs of working materials now range, I find the ordinary metals, e. g. flat galvanized iron strips, most to be preferred.

All fruit juices and solid fragments of fruit can be washed from a material having such a surface as is here provided; and it is practicable under factory and farm conditions to remove all foreign matter from the surface of baskets so made—which is not true of any fruit-contacting part of the basket if its interior face is of wood.

The preferred form of the invention reduces the finding of mold in the commercial products of the factory, by preventing or delaying pre-factory development of mold in the fruit. It does this by constructing the contact surfaces, to which the fruit is exposed in the field and in transportation to the factory, entirely of germ free materials. For this, metal slats are convenient. Alternatively, organic materials may be used if they have permanently the said smooth and non-absorbent surface.

Another feature of my improved basket, whatever the principal material of the basket may be, is that, preferably, it is free from fastenings which may rust loose, and become projections into or mingled with the contents of a basket, thereby to avoid both danger to persons handling the basket, and danger to contents.

The mentioned objects and results may be obtained by employing only strip material, of the character described, which provides surfaces which are inherently smooth and free from juice-catching fissures—material which has sufficient stiffness and durability but which nevertheless can be permanently shaped by bending. Strips of thin galvanized iron are suitable, each of which may extend down one side, across the bottom, and up the other side of the basket. These overlie each other centrally of the bottom and all may be there joined by a single rivet with flat head.

Pressed-out loops, one in each stave, at one or more mid-height levels, provide eyes through which wire hoops may be threaded, each hoop extending exteriorly around all of the staves at its particular elevation, made continuous by a welding of its ends together. An additional wire hoop, with ends welded together, extends around the tops of the staves, at the basket rim. Each top end of stave is rolled outward making a loop or eye through which the hoop extends. Preferably the staves will extend from bottom to top with slight outward inclination.

In case some other smooth surfaced non-absorbent material is employed for the staves, such as any of the commercially available plastics, the shape of stave preferably will be attained by whatever softening and molding process is appropriate to the particular plastic employed. If the staves are made by applying a superficial coating of such material to wood, or other materials, that coating must be one that seals the pores of the covered material durably and permanently.

It is intended that the patent shall cover, by suitable expression in the appended claim, whatever features of patentable novelty exist in the invention disclosed.

In the accompanying drawing:

Figure 1 is a side elevation of a basket embodying features of the invention;

Figure 2 is an elevation in vertical section on 2—2 of Figure 1; and

Figure 3 is a top plan in section on 3—3 of Figure 1.

Referring to the drawing, the basket staves 10, or at least their interior faces, are of germ-free material as hereinbefore defined.

The basket can be made in the well-known tapering shape, which provides ventilating spaces when filled and permits the nesting of baskets together when empty. The drawing illustrates a basket of this type, each stave being a relatively broad, flat and thin strip 10, continuous downward from a broad top of the basket, across a narrow bottom 12, and up to the opposite part of the top. By this continuity there are no joints or cracks anywhere in the individual stave. At the centre of the bottom, where the staves all overlie each other, there are cracks between the staves, but in all of those cases such cracks are at successively lower levels. Fruit having a rounded surface, laid on the bottom, cannot touch those under bottom cracks. Side and top spaces between edges of adjoining strips are large enough for those edges to be well cleaned; and fruit here will mainly rest against the germ-free interior flat faces. When thus made the interior surface of the basket is therefore devoid of all recesses, both microscopic and macroscopic, which might hold fruit juice, either fresh or decaying, or any other medium on which fungi or other parasites can live.

At as many levels as may be desired, intervening between top and bottom, wire hoops 16 may be arranged to reinforce the basket. These are conveniently assembled by being thrust through loops 14 integral with the several staves, each loop being a small strip cut and bellied outward from and integral with the body of the stave. The wire hoops 16 threaded through these loops are made endless by welding together their ends as at 18 so that they constitute smoothly continuous reinforcing and restraining bands.

At the top of the basket, a similar hoop 20, somewhat larger in diameter, is threaded through eyes formed on the staves by an out-turning of each end of stave into an eye capable of receiving the hoop 20, which latter may have its ends welded together as at 22.

As shown in Figure 3, the bottom of the basket is formed by overlapping the flat thin strips 10, said strips being secured together by means of a suitable rivet or the like 24.

When in use, the freedom of the interior surface from fissures, and the non-absorbent character of the surface, permit of the interior being made barren of micro-organisms by ordinary cleansing methods. The absence of interior basket-wall roughness minimizes the skin abrasions suffered by units of fruit as they are put into the basket, and so minimizes the areas of fruit which are prone to infection. Also it minimizes the outflow of juice which can later become host to parasitic micro-organisms. Also there results less extrusion of juice while the filled baskets are being jounced along the road in trucks, in transportation to a cannery. And, second, no juice which has wet the basket can remain unobserved so as to become a nutrient medium for mold, at a place where it can by contact transmit its spores to other fruit later carried in the same basket.

While the normal service of the basket thus described is for repeatedly receiving fruit at the field, and bringing it to the cannery, its special germ-free characteristics permit of its being safely used to avoid another source of loss, which occurs when fruit is so ripe that it must be harvested and yet the cannery is so busy that it cannot be handled with due promptness. In such cases the baskets can serve to hold fruit in temporary storage, minimizing the development of mold which hitherto has damaged fruit thus held.

Baskets embodying the invention are naturally more costly than those made of wood, but whereas the ordinary basket of wood has a useful life of only about two crop seasons, the basket of the invention can be made of material which will last many years. The wooden basket, after getting wet, carries a sourness from the tomatoes, which increases, the more the basket is used, as the tomato season goes on. I believe that the cause or source of this sourness is also the source from which the freshly picked ripe fruit becomes so quickly infected with mold. The sourness of the wood cannot be removed by cleansing. My improved harvesting basket which has the interior surface herein described is unable to hold the said source of sourness, when cleansed.

The basket can serve for other crops than the tomatoes for which its use is herein illustratively described.

I claim as my invention:

In a harvesting basket for juicy, thin-skinned fruit, said basket being substantially circular in transverse cross-section and formed of substantially similar U-shaped thin metal strip units having their base portions overlapping and secured together to form the bottom of the basket and having their upstanding portions arranged in spaced outwardly flared relation to form the sides of the basket, said strips being bent adjacent their upper ends outwardly and embracing a hoop for securing the strips together at their upper portions, combined with means for securing said strips together at a point intermediate of their upper and bottom portions, said last mentioned means including a hoop encircling the outer side portions of said strip units, said last named hoop being secured to said strip units by loops struck outwardly from said strip units and formed integrally therewith, an anti-mold construction in which the interior surfaces of the side walls of the basket which are exposed to contact with fruit in the basket are smooth, free from angles protuberant inwardly of the basket, and are aseptic, non-porous and substantially free from crevices between structural members of the side walls, and from superficial microscopic and macroscopic recesses except recesses which are evacuable of germ nutrient fruit juices by superficial washing; whereby the occurrence of mold in fruit harvested in the basket is avoided.

WALLACE W. DALE.